(No Model.)  6 Sheets—Sheet 1.

S. W. MAQUAY.
GALVANIC BATTERY.

No. 433,738.  Patented Aug. 5, 1890.

Witnesses
N. S. McArthur
Georgia P. Kramer

Inventor:
S. W. Maquay
By Foster & Freeman
Attorneys.

(No Model.) 6 Sheets—Sheet 2.

S. W. MAQUAY.
GALVANIC BATTERY.

No. 433,738. Patented Aug. 5, 1890.

Witnesses.
H. S. McArthur.
Georgia P. Kramer.

Inventor:
S. W. Maquay.
By Foster & Freeman
Attorneys.

(No Model.) 6 Sheets—Sheet 3.
S. W. MAQUAY.
GALVANIC BATTERY.

No. 433,738. Patented Aug. 5, 1890.

Witnesses.
H. S. McArthur.
Georgia P. Kramer.

Inventor:
S. W. Maquay.
By Foster & Freeman
Attorneys.

(No Model.) 6 Sheets—Sheet 4.
S. W. MAQUAY.
GALVANIC BATTERY.

No. 433,738. Patented Aug. 5, 1890.

Witnesses.
H. S. McArthur,
Georgia P. Kramer.

Inventor:
S. W. Maquay.
By Foster & Freeman
Attorneys.

(No Model.)  6 Sheets—Sheet 5.

S. W. MAQUAY.
GALVANIC BATTERY.

No. 433,738.  Patented Aug. 5, 1890.

Witnesses
H. S. McArthur
Georgia P. Kramer

Inventor.
S. W. Maquay
By Foster & Freeman
Attorneys.

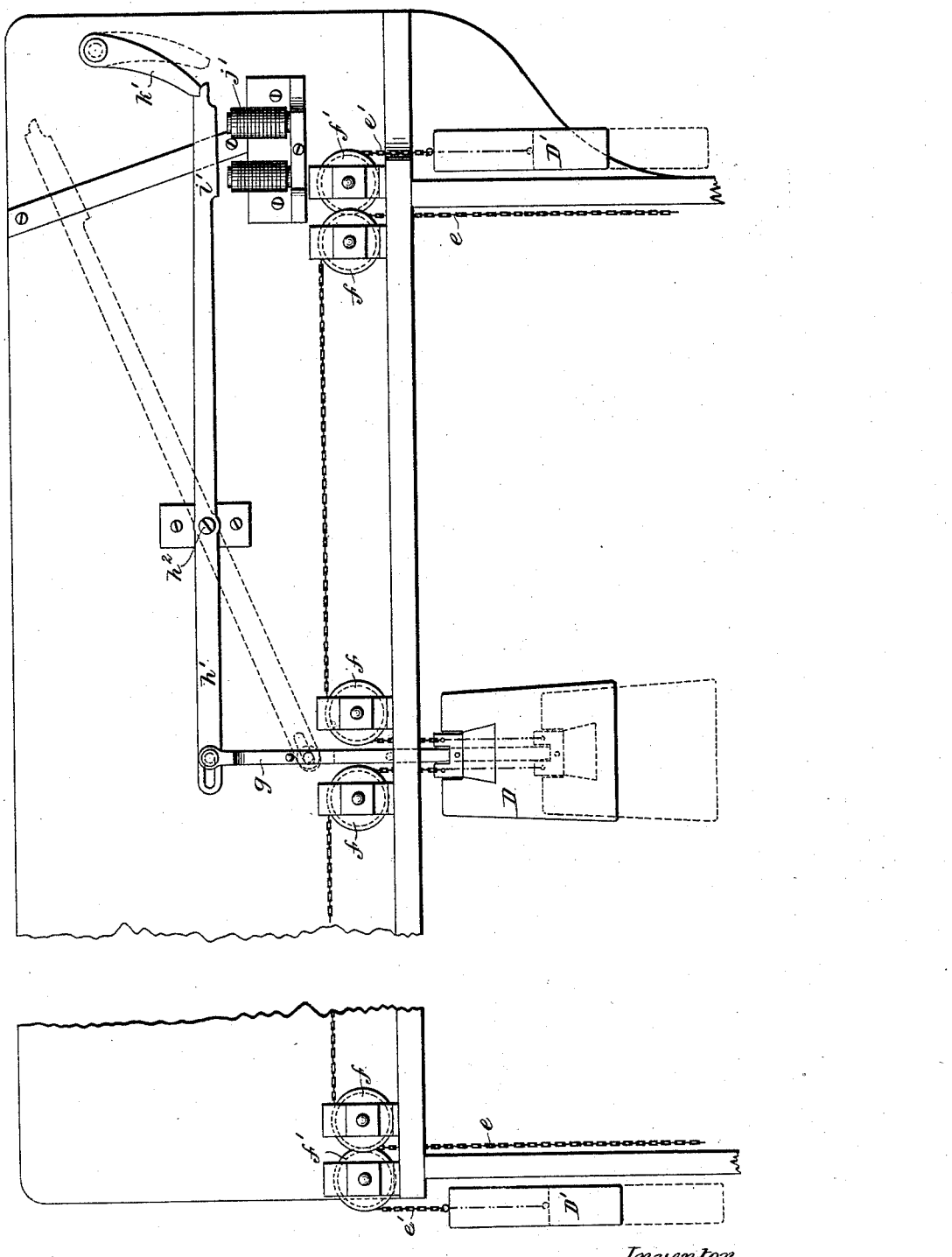

UNITED STATES PATENT OFFICE.

SAMUEL WILLIAM MAQUAY, OF FULHAM, COUNTY OF MIDDLESEX, ENGLAND.

GALVANIC BATTERY.

SPECIFICATION forming part of Letters Patent No. 433,738, dated August 5, 1890.

Application filed September 30, 1889. Serial No. 325,507. (No model.) Patented in England January 21, 1887, No. 990; in France August 12, 1887, No. 185,298; in Germany August 16, 1887, No. 43,622; in Austria-Hungary March 12, 1888, No. 42,629 and No. 6,474, and in Belgium October 15, 1888, No. 83,609.

*To all whom it may concern:*

Be it known that I, SAMUEL WILLIAM MAQUAY, a subject of Her Majesty the Queen of Great Britain, residing at Fulham, in the county of Middlesex, England, have invented a new and useful improved means for feeding electric batteries and for removing and replacing the plates thereof, (for which I have received patents in Great Britain, No. 990, dated January 21, 1887; in France, No. 185,298, dated August 12, 1887; in Germany, No. 43,622, dated August 16, 1887; in Belgium, No. 83,609, dated October 15, 1888, and in Austria-Hungary, No. 42,629 and No. 6,474, dated March 12, 1888,) of which the following is a specification.

This invention relates to improved means for feeding electric batteries with the desired liquids during such time as the current is being used, for the purpose of replacing the weakened or spent solutions which are discharged to waste by suitable means, together with means for stopping the feed and for removing the plates or electrodes when the battery is not in use, the plates being replaced either by hand or through the action of the current from a supplemental cell or from the battery itself, all as hereinafter particularly described, reference being made to the accompanying drawings, forming part of this specification, and which clearly indicate the manner of carrying my invention into effect, and in which—

Figure 1:
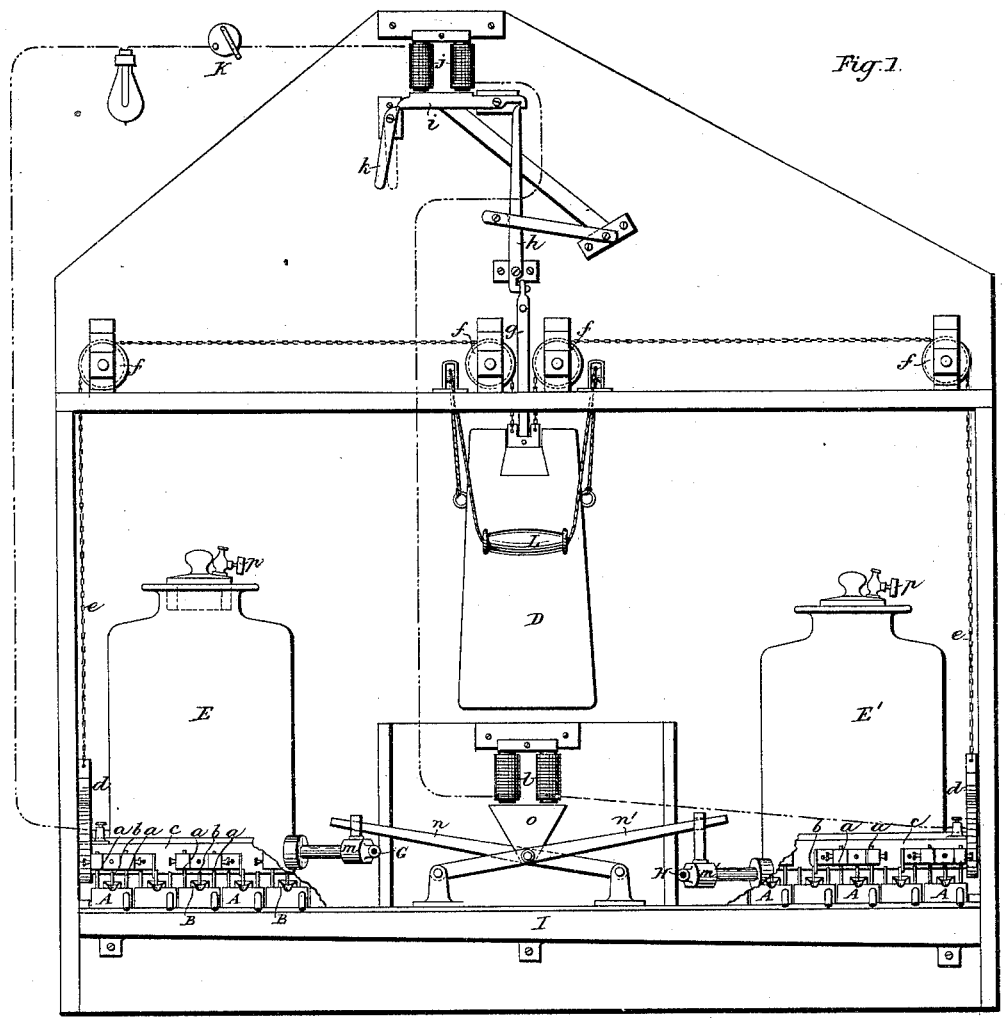
Figure 2:
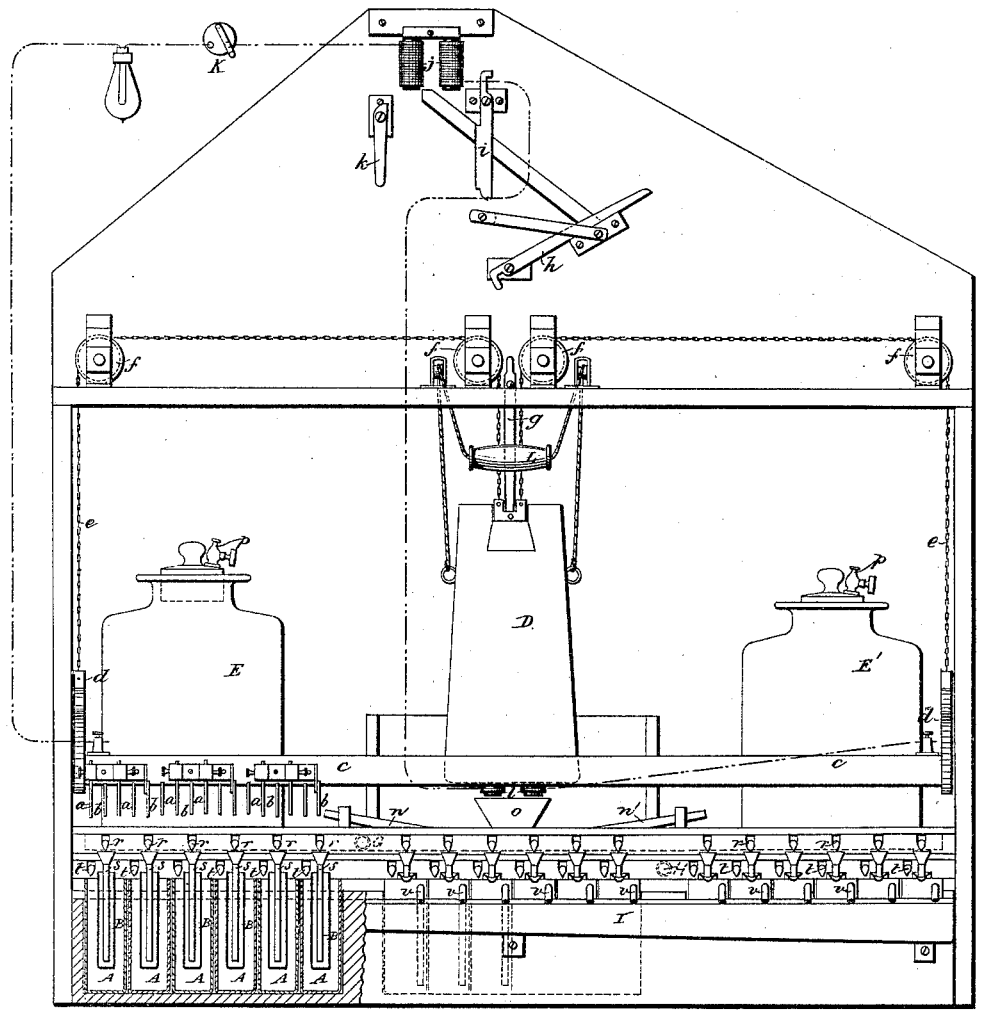
Figure 3:
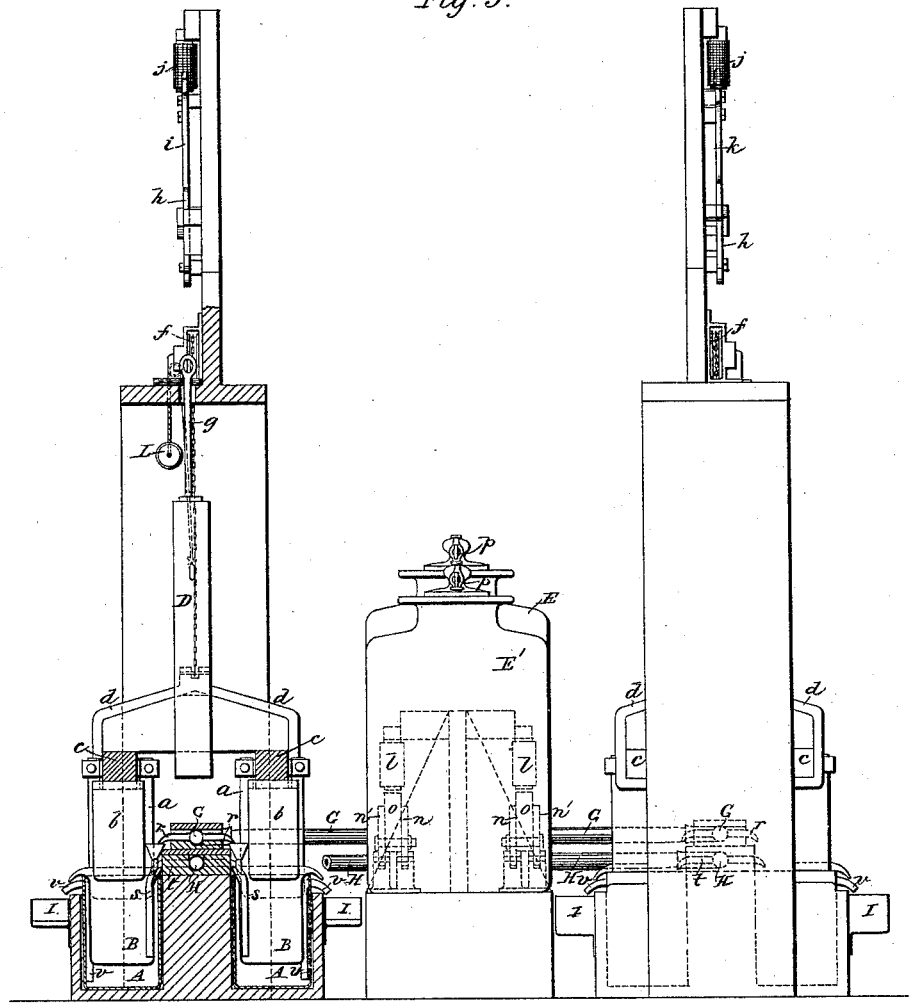
Figure 4:
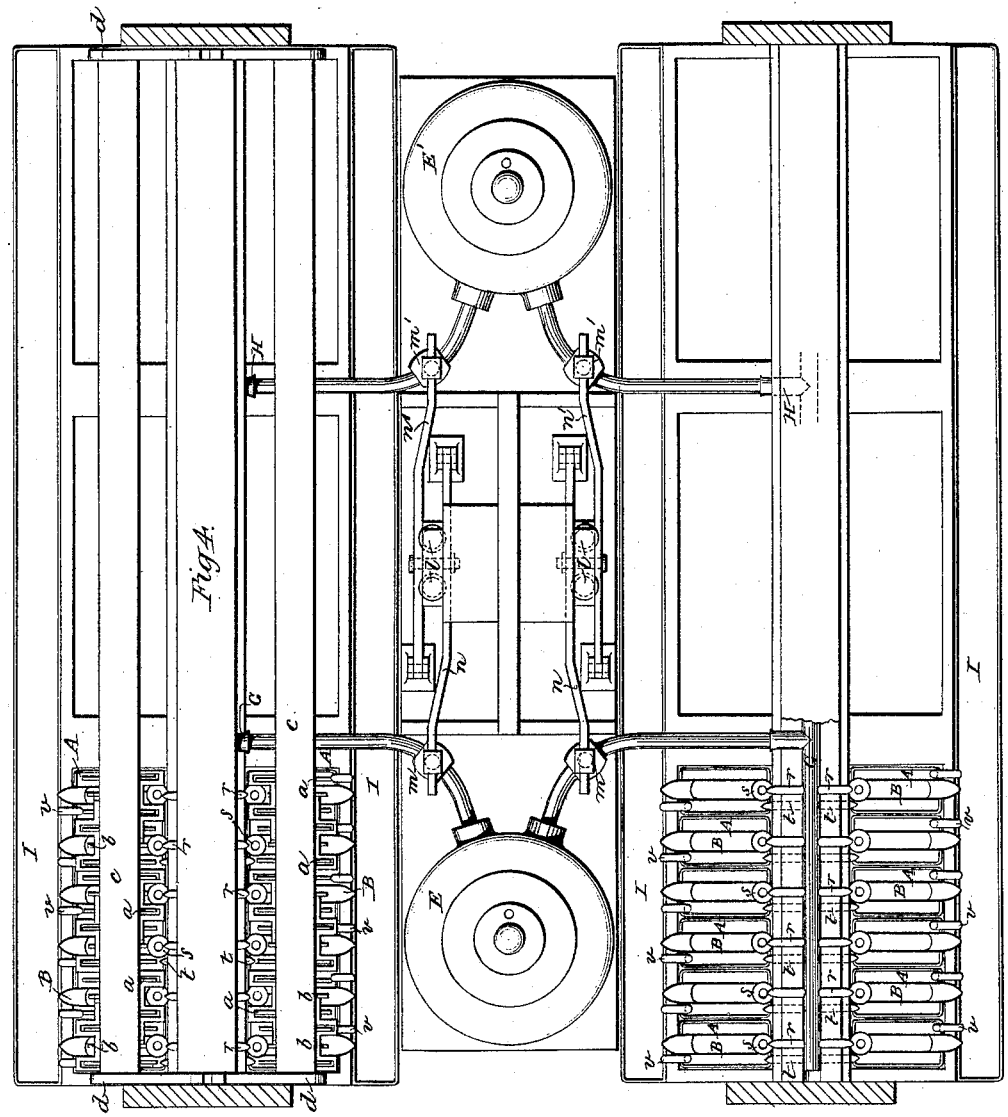
Figure 5:
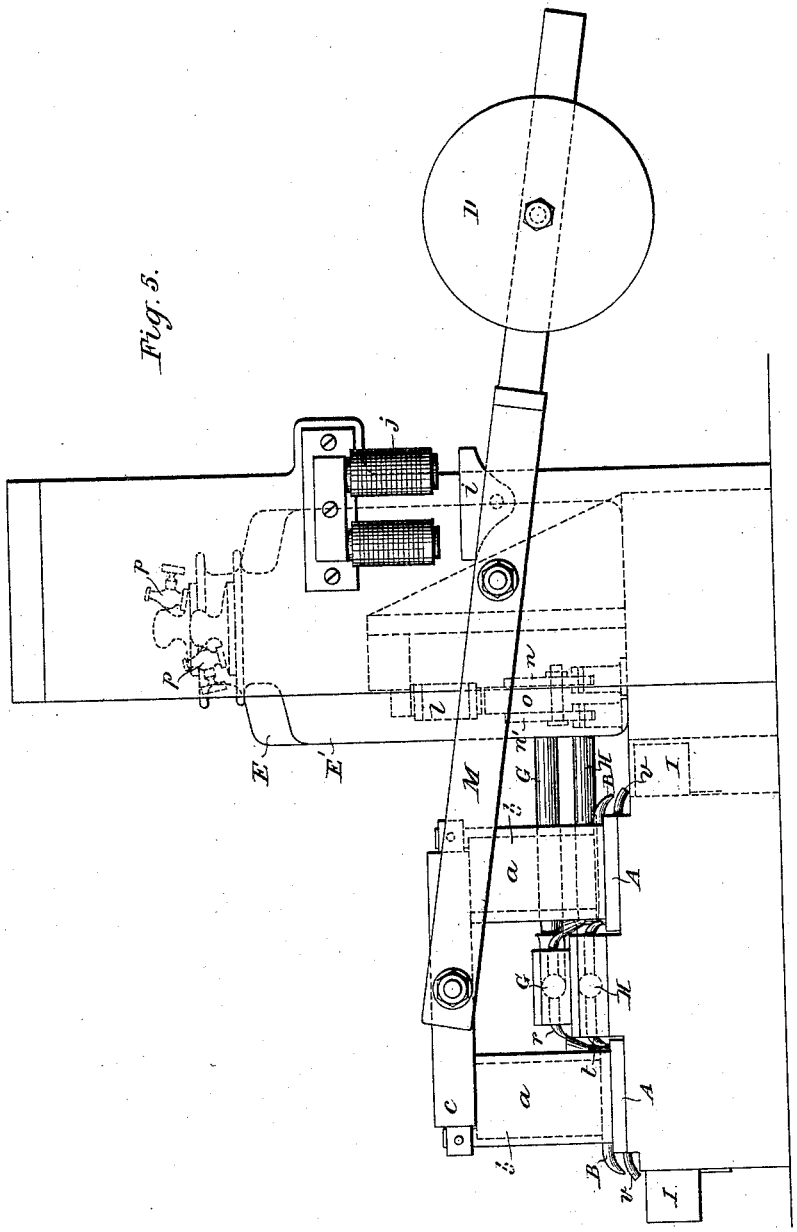

Figure 1 is an elevation of a set of battery-cells carried in a frame-work, on the upper part of which is shown a convenient arrangement of magnets, levers, and counter-weight for raising and lowering the plates from and into the cells, the plates in this figure being shown as down and ready to be put into action, the vessels for containing the positive and negative exciting-liquids, with the device for controlling the flow therefrom, being shown at the back. Fig. 2 is a similar view with the plates shown as raised from the cells by the action of the levers and counter-weight. Fig. 3 is a side elevation, partly in section, showing two frames, each carrying a double row of cells, with the vessels for the positive and negative exciting-liquids, and regulating devices for controlling the flow thereof. Fig. 4 is a plan view of same, parts being omitted for the sake of clearness. Fig. 5 represents an end view of a battery into and from which the plates are lowered and raised by means of the action of a counterweighted lever acted upon by the counter-weight and an electro-magnet. Fig. 6 represents a modified arrangement of the magnets, levers, and counter-weights shown in Figs. 1, 2, and 3.

The cells which I prefer to employ consist of an outer or positive vessel A and an inner or negative vessel B, which may be placed in a suitable wooden frame-work, as shown, each frame in the drawings holding thirty-six cells. The positive zinc plates $a$ and the negative carbon plates $b$ are held by suitable clips upon bars $c\ c$, which are carried by arms $d\ d$ at the sides of the uprights of the frame-work, chains or cords $e\ e$ running from thence over suitable pulleys $f$ to a counter-weight D, which is somewhat heavier than the weight of the battery plates, bars, and connections. This weight has an upright bar $g$ in a ring, on the upper part of which, when the parts are in the position shown in Fig. 1, the hooked end of a pivoted arm or lever $h$ engages. The upper end of this lever is held by the hooked end of the pivoted armature $i$ of the magnets $j$, this armature being held up when the current is not passing through the magnets by a pivoted lever $k$, the point of which is placed in a notch on the end, as shown.

The vessels for holding the positive and negative exciting solutions may be glass bottles or jars E E', having taps or valves $m\ m'$, through the spindles of which are passed the ends of pivoted levers $n\ n'$, which may be arranged as shown, both of which are capable of being lifted to allow the passage of the liquids when the armature $o$ is attracted to the magnets $l$. As this arrangement of levers and valves does not permit of any regulation of the amount of liquid passed, (the valves being capable only of being either fully opened or entirely closed,) I provide in the stopper of the vessels, or at some other suitable point, cocks $p$, through which a regulated quantity of air may be admitted above the liquids in the vessels, and thus serve to control the outflow.

The negative exciting-liquid from the vessel E passes to a main supply-pipe G, preferably of glass, which, as shown in Figs. 2 and 3, may, where necessary, be covered with a wooden casing to protect it. From this pipe project small branch pipes $r$, through which the liquid passes drop by drop into the funnel-shaped mouths of tubes $s$, thus supplying the negative cells with the fresh liquid from the bottom, while the spent liquid, which has become lighter, flows away from the top over lips into a trough I to waste. In the same way the positive liquid from the vessel E' passes to a main supply-pipe H, situated beneath the pipe G, similarly encased, and having also branch pipes $t$, through which the liquid passes drop by drop into the positive cells, the spent liquid, which is heavier than the fresh, being drawn off from the bottom to waste by the siphon-tubes $v$ into the trough I.

The operation of the parts is as follows: The positive and negative plates being in their respective liquids in the filled cells, the various other parts are in the position shown in Fig. 1. Upon the current being turned on at the switch K to the lamps or to other uses it passes in the first instance to the magnets $l$, thereby attracting the armature $o$ to them, which raises both of the levers $n$ and $n'$, thus opening the taps $m$ $m'$ and permitting the battery-liquids to flow through the pipes G H to the numerous branch pipes $r$ $t$, and from thence drop by drop into their respective cells, the quantity being so regulated as to keep the liquids in the cells as nearly as possible at a uniform strength. The current at the same moment passes up to the magnets $j$, and, attracting thereto the pivoted armature $i$, passes on to the lamps. When the armature is in this position, the lever $k$ is released from the notch and by its own weight falls into the position shown in dotted lines in Fig. 1, thus clearing the way for the armature when it is ready to fall. The turning out of any of the lamps in the circuit will not move the parts out of action, but as soon as the last lamp or the main switch K is turned off, the circuit being broken, the magnets cease to attract the armature $i$, which falls into the position shown in Fig. 2, thus releasing the end of the arm $h$, which in its turn releases the bar $g$ of the counter-weight. The latter then slowly descends, and, as will be readily seen, lifts the plates entirely or nearly out of the cells, while at the same time the armature $o$ falls away from the magnets $l$, thus through the levers pressing down the spindles of the valves $m$ $m'$ and shutting off the supply of liquid to the cells.

In Fig. 6 I have shown an arrangement by which the number of parts employed in the first-described arrangement is lessened, while instead of the large central counter-weight D a smaller one suspended in the same manner is employed with the additional weights D' D', carried by chains $e'$, passing over pulleys $f'$ and down to the arms $d$. (Not shown in this figure.) This arrangement of weights is sometimes found more convenient, as the single large weight D is found to be sometimes in the way when a cell is to be removed.

The modified arrangement of levers consists in connecting the bar $g$ with the slotted end of a lever $h'$, pivoted at $h^2$, the outer end of which carries an armature $i'$, the notched end of which is held in position above the magnets $j'$ by the pivoted lever $k'$. The operation of this arrangement, as will be readily seen, is similar to that of the arrangement first described.

The lever $h'$ is set into the position shown in solid lines in Fig. 6 by hand, the weights being then up and the plates in the cells. Upon the current being turned on at the switch K, (shown in Figs. 1 and 2,) the armature $i'$ is attracted to the magnets $j'$, which must be of some power to do this, as it necessitates a slight lifting of the weights D and D' D', which, though nearly, are not quite counterbalanced by the weight of the plates. The pivoted lever $k'$ thereupon falls into the position shown in dotted lines, the armature being held to the magnets until the last lamp or the switch K is turned off, when, the circuit being broken, the weights will run down, carrying the lever $h'$ into the position shown in dotted lines in Fig. 6. The arrangement is somewhat more convenient for setting in position than that shown in Figs. 1, 2, and 3, as the handle L for drawing up the weight is dispensed with, the end of the lever $h'$ being used for that purpose, while said lever has only to be set at one point instead of the three points which require attending to in the other arrangement.

When the plates are to be placed in the cells automatically instead of by hand, I prefer to use the construction of apparatus illustrated in Fig. 5, in which the bar $c$ is raised or lowered by the movement of one or more levers M, carrying counter-weights D and armature $i$ beneath the electro-magnet $j$. With this construction the counter-weight just overbalances the weight of the plates $a$ $b$ and bar $c$, so that if the circuit through the magnets $j$ is broken the armature is no longer held thereto, and the weight falls and raises the plates from the cells at the same time that the feed of the exciting-liquids is cut off.

The current to the electro-magnet $j$ may be obtained by the use of supplemental cells or by leaving some of the plates $a$ $b$ always in the battery, or by so arranging the lever that they are never lifted quite clear of the cells, all that is required being a current of sufficient strength when switched on to attract the armature $i$ to the magnets $j$, and thus depress the main plates into the cells.

The weight D is adjustable on the lever M, so that as the plates become lighter after continued use said weight may be moved farther up the lever, as if this is not done the proper balance is not maintained and the attraction of magnets *j* will not be sufficient to draw the lever up, and therefore the system of lowering said plates by hand may be found preferable in many places, and in Figs. 1, 2, and 3 I have shown this construction, in which the counter-weight D is drawn up and the plates replaced by means of the handle L, the other parts being set back into the position shown in Fig. 1 by hand, while in Fig. 6, as described, the weights D D' D' are drawn up and the plates replaced by means of the lever *h'*.

Although I do not confine myself to any specific liquids for the cells, I prefer to use for the positive solution one part of sulphuric acid to twenty parts of water, the action of which upon the zinc electrodes forms a sulphate of zinc, so that the spent solution is heavier than the fresh, while for the negative cells I use a solution of about the following proportions: bichromate of potash, four ounces; sulphate of ammonia, one ounce; chromic acid, three pounds; sulphuric acid, twenty fluid ounces, and water, three pints, this being about the quantity required for the two frames of thirty-six cells each. This solution weakens and becomes lighter by use.

It will be understood that I do not confine myself to the exact arrangement of parts, or to the number of or particular cells shown or liquids described, as in practice the parts can be arranged to suit the requirements of the work, or single-liquid battery-cells can be used, in which case only one reservoir-vessel with tubes and branches will be necessary.

What I claim is—

1. The combination, with a series of battery-cells and the reservoir for supplying said batteries with liquid, of taps controlling the flow of said liquid, an electric circuit including the said batteries and an electro-magnet, and an armature and connections between the armature and taps, whereby when the circuit of the battery is closed the magnet will be energized and the taps will be opened to permit the flow of liquid to the cells, and when the circuit of the battery is broken the magnet is de-energized and the flow of liquid will be stopped, substantially as described.

2. The combination, with a series of battery-cells, of a support for the plates of said cells, a counter-weight connected to said support, a locking-support for the counter-weight, an electric circuit including the battery-cells and a magnet, and an armature for the magnet controlling the locking-supports for the counter-weight, whereby when the circuit of the batteries is broken the counter-weight will be released and the plates automatically removed from the cells, substantially as described.

3. The combination, with the series of cells and support carrying the plates therefor, of a counter-weight connected to said plates, a locking-support for the counter-weight, an armature controlling said support, a mechanical device for holding said armature in position when no current is on, and an electric circuit including a magnet for the armature, whereby when the circuit is closed the armature is released from its locking device and when the circuit is opened the counter-weight support is released by the armature, substantially as described.

4. The combination, with a series of battery-cells, reservoirs for supplying the cells with liquid, taps controlling the flow of the liquid, a support carrying the plates of the cells having a counter-weight, an electric circuit including two magnets, armatures for the magnets, the one controlling the flow of liquid from the reservoirs and the other controlling the position of the counter-weight, whereby when the circuit is closed the liquid is permitted to flow into the cells and the plates to be immersed therein, and when the circuit is broken the flow of the liquid is stopped and the plates removed from the battery, substantially as described.

In testimony whereof I have hereunto set my hand in the presence of two subscribing witnesses.

SAMUEL WILLIAM MAQUAY.

Witnesses:
 PHILIP M. JUSTICE,
 JAMES BOLES.